United States Patent [19]

Izumi et al.

[11] 3,840,994
[45] Oct. 15, 1974

[54] METHOD AND DEVICE OF AUTOMATIC MEASUREMENT FOR USE WITH A NUMERICALLY-CONTROLLED LATHE

[75] Inventors: Tadayoshi Izumi; Hideo Hirokawa, both of Kawasaki; Toshihiro Tsutsui, Sagamihara, all of Japan

[73] Assignee: Ikegai Tekko Kabushiki Kaisha, Tokyo, Japan

[22] Filed: Mar. 5, 1973

[21] Appl. No.: 338,039

[30] Foreign Application Priority Data
Mar. 4, 1972 Japan.......................... 47-26909[U]

[52] U.S. Cl........... 33/174 PC, 33/174 Q, 33/174 L
[51] Int. Cl........ G01b 7/00, G01b 7/12, G01b 7/31
[58] Field of Search........ 33/174 L, 174 PC, 174 Q, 33/174 M, 178 E, 143 L, 125 T; 82/2 B

[56] References Cited
UNITED STATES PATENTS
2,835,042  5/1958  Tandler et al.................... 33/174 L
3,226,833  1/1966  Lemelson....................... 33/174 PC
3,633,011  1/1972  Bederman....................... 33/174 L Primary Examiner—Harry N. Haroian
Assistant Examiner—Richard R. Stearns
Attorney, Agent, or Firm—Cushman, Darby & Cushman

[57] ABSTRACT

This invention discloses a method and device of automatic measurement for use with a numerically-controlled lathe, wherein a detector head is made to travel so that the probes of the detector head are alternately brought into contact with an object to be measured at the diametrically spaced two positions thereof for detecting the deviations of the actual dimension from the programmed dimension by the deflection of the probes, the sum or the average value of the deviations being a correcting quantity for the tool position.

3 Claims, 8 Drawing Figures

METHOD AND DEVICE OF AUTOMATIC MEASUREMENT FOR USE WITH A NUMERICALLY-CONTROLLED LATHE

BACKGROUND OF THE INVENTION

According to a conventional automatic measuring device (FIG. 7) for use with a numerically-controlled lathe, a detector head 53 is attached on the cross slide 52, a pulse motor 56 is driven in response to the command information applied to the numerical controller to make the cross slide travel so that the probe 54 on the detector head 53 is brought into contact with the work piece 55 for detecting the deviation of the surface to be machined, and the deviation is converted into the tool position correcting quantity by means of an analog-digital converter 57 to be applied to the numerical controller 58.

Such a device, however, is unsatisfactory in that when the central axis of the spindle is displaced by $\epsilon$ due to the thermal deformation of the spindle slide, the tool tip position is always corrected in response to the tool position correcting quantity which includes said displacement $\epsilon$, so the precise correction cannot be achieved.

To avoid the influence of the thermal deformation of the spindle slide, it has been necessary to provide the spindle with a reference gauge and determine the deflection of the reference gauge for correcting the thermal deformation before measuring the work piece.

SUMMARY OF THE INVENTION

The purpose of this invention is to provide an automatic measurement correcting device for use with a numerically-controlled lathe, the device having an ability to correct the tool position precisely even when the spindle's center axis is deflected due to heat or other factors.

DETAILED DESCRIPTION OF THE INVENTION

Figure 1:
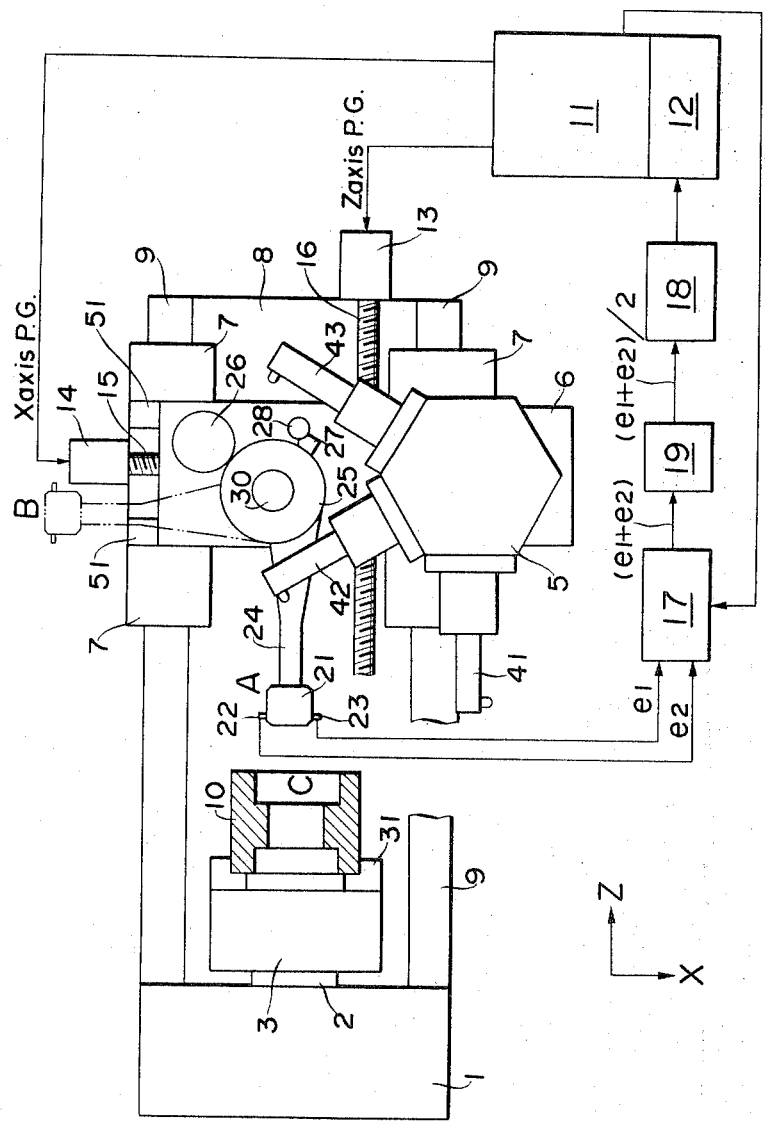
FIG. 1 is a schematic block diagram of the automatic measuring device according to this invention.

Now the device of this invention will be described with reference to FIGS. 1 and 2. A chuck 3 attached to the spindle 2 which is rotatably supported by the spindle slide 1 holds the work piece 10 with its claws 31 and rotates together with the spindle 2. The spindle slide 1 is securely attached to the bed 8, which is provided with guide ways 9 extending in parallel with the axis of the spindle (hereinafter called the Z direction), and permits the saddle 7 to slide only in the Z direction. The saddle has guide ways 51 for the cross slide extending perpendicular to the axis of the spindle and allows the cross slide 6 to slide only in the perpendicular direction to the Z direction (hereinafter called the X direction). The bed 8 is provided with a Z axis pulse motor 13 which turns the Z axis pole screw shaft 16 so the saddle 7 is made to travel in the Z direction. The saddle is provided with an X axis pulse motor 14 which turns the X axis pole screw shaft 15 so the cross slide 6 is made to travel in the X direction. The tool head 5 located at the predetermined position of the cross slide 6 rotates around an axis which is vertical to the sliding surface of the cross slide 6. A plurality of tools 41, 42, 43, etc., can be attached to the tool head 5. The rotary section 25 of the arm 24 having a detector head 21 secured to its one end, is located at the predetermined position of the cross slide 6 and rotates around a rotary shaft 30 extending perpendicularly to both the axis of the spindle 2 and the X axis pole screw shaft 15. The rotary section 25 is driven by the rotary actuator 26 by way of a gear and rotates between the measuring position A and retreated position B of the detector head 21 in the direction which does not interfere with the movement of the tool head 5. The positioning of the detector head 21 at the measuring position A is carried out by engagement of the stopper pin 27 fixed to the rotary section 25 with the stopper 28 fixed to the cross slide 6. The arm 24 is so designed that its movement does not interfere with the tool 42 attached to the tool head 5 as shown in FIG. 2. In FIG. 2 the rotary shaft 30 is held by the base 29, which in turn is secured to the cross slide. The stationary section of the clamping actuator 61 which is built in the rotary section 25 is fixed to the base 29; while the movable section of the actuator 61 is retained by the rotary section 25. When the movable section moves in the axial direction of the rotary shaft 30, the rotary section 25 is clamped to the base 29.

Figure 4:
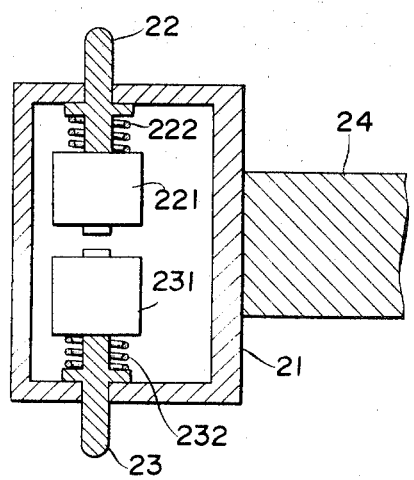
FIG. 4 is a sectional view of the measuring head.

The construction of the detector head 21 will be explained with reference to FIG. 4. Differential transformers 221 and 231 are secured to the detector head 21 at their coil portion and directly connected to the probes 22 and 23, respectively, at their core portion. The probes 22 and 23 are pressed against the inner wall of the detector head 21 by means of springs 222 and 232, respectively.

Figure 2:
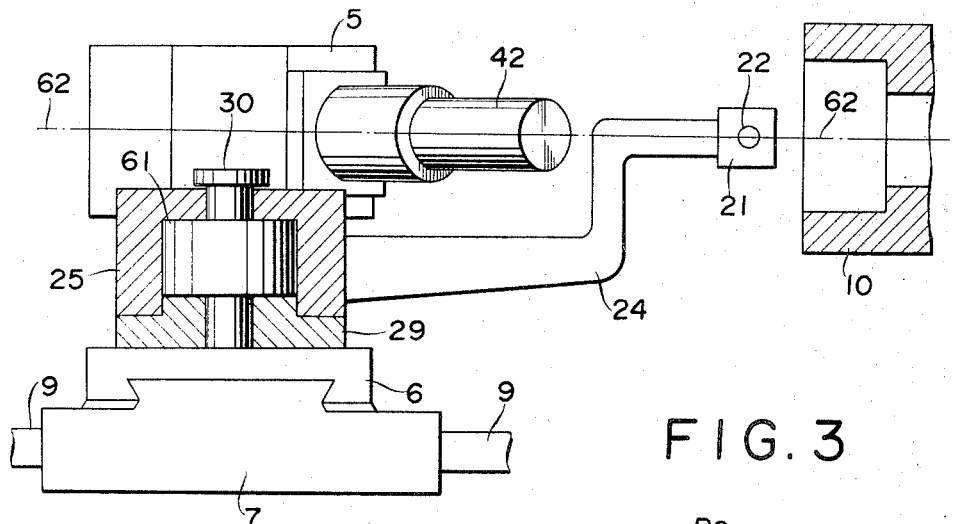
FIG. 2 is a sectional view of the retreating device.

The outputs from the differential transformers 221 and 231 are applied to the analog calculator 17 shown in FIG. 1. The function of the analog calculator 17 will be described later. The output from the analog calculator 17 is reduced to 1/2 by the multiplier 19 and then converted to a digital quantity by the analog-digital converter 18. The digital quantity is then applied to the tool position correcting circuit 12 which forms a part of the numerical controller 11. The numerical controller 11 distributes pulses to the X axis pulse motor 14 and Z axis pulse motor 13 so that the tool head 5 is made to travel in response to the command information applied externally. The numerical controller 11 also serves to correct the distribution of pulses in accordance with the information applied to the tool position correcting circuit 12. Furthermore, the numerical controller 11 makes the calculator 17 start calculation and apply the results of the calculation to the analog-digital converter 18, and after that clears all the values memorized in the analog calculator 17.

The operation of the device according to this invention will be described hereinunder. When the work piece 10 is being cut by any one of the tools 41, 42 and 43, the detector head 21 is in the retreated position B of FIG. 1 so that it does not interefere with the work piece and tools. Preceding the final finish cutting the rotary actuator 26 is driven in accordance with the command by the numerical controller 11 and the rotary section 25 is rotated until the pin 27 engages with the stopper 28. Following to this the clamping actuator 61 shown in FIG. 2 operates so the rotary section is clamped to the base 29. At this time the detector head 21 is located at the position A of FIG. 1.

Figure 3:
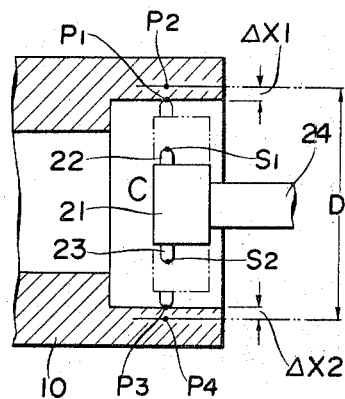
FIG. 3 is to show the principle of measurement and representing the relative movement of the object to be measured and the measuring head.
Figure 6:
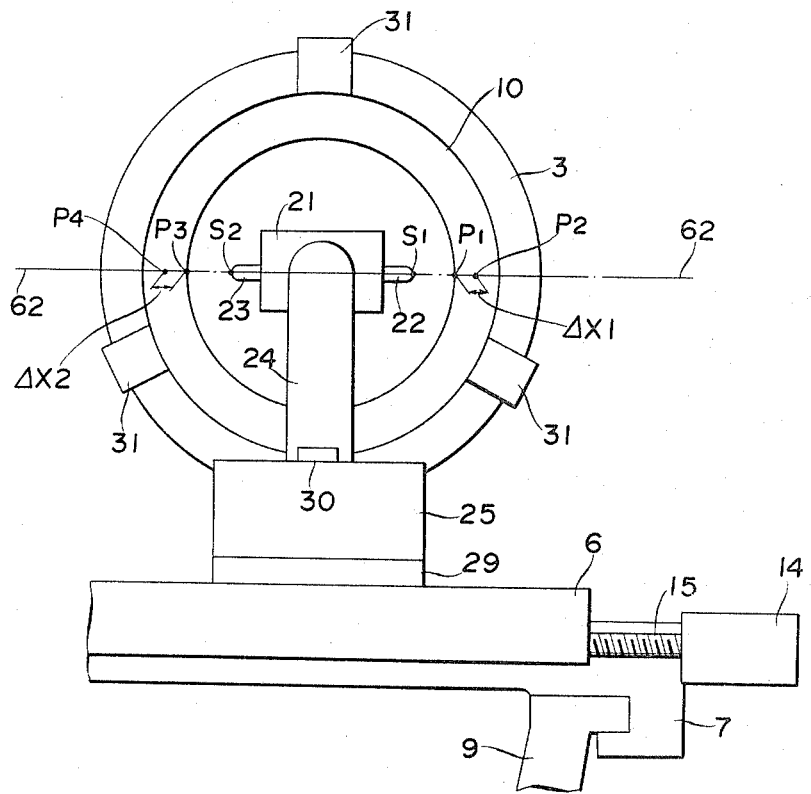
FIG. 6 shows the relationship between the movement of the cross slide and the position of the measuring head.
Figure 7:
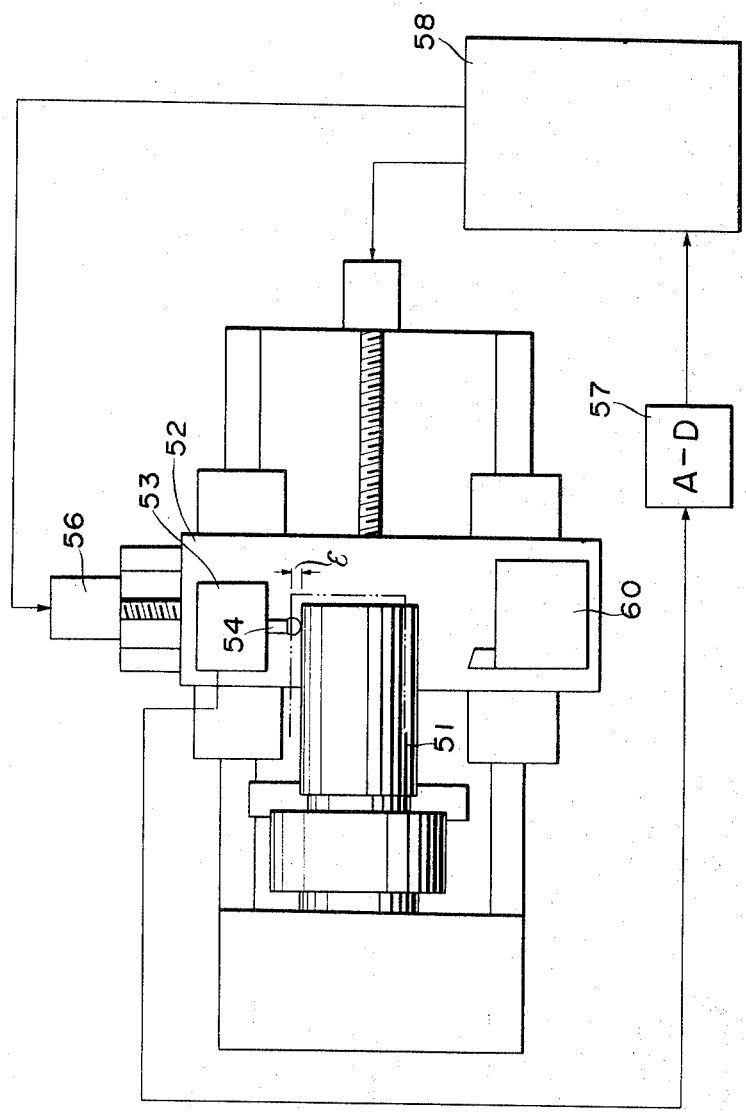
FIG. 7 is a schematic view of a conventional automatic measuring device for use with a numerically controlled lathe.

FIGS. 3 and 6 represent examples of inner diameter measurement, of which procedures will be described hereunder. The travel of the detector head 21 can be controlled precisely in just the same manner as the tool head 5 by distributing pulses to the X axis pulse motor 14 and Z axis pulse motor 13 by means of the numerical controller 11 in response to the information applied thereto.

The detector head is first made to travel to the measurement starting position C. It is previously programmed that the tip S1 of the probe 22 should reach a predetermined point P2 which is still now inside the inner wall of the bore roughly processed. Then, pulses are applied to the X axis pulse motor 14 so that the tip S1 of the probe 22 reaches the point P2 in accordance with the program. However, the tip S1 has its movement interrupted by the inner wall of the roughly processed bore to be brought into contact with a point P1 on the inner wall surface while the detector head continues moving to reach its programmed position, with the result that the probe 22 is displaced by $\Delta x$, which is equal to the spacing between P1 and P2. As a consequence, a voltage $e1$ which corresponds to the displacement of the probe 22 is generated in the differential transformer 221. The output voltage $e1$ from the differential transformer 221 is then fed to the analog calculator 17.

In the same manner as the tip S1, also the tip S2 of the probe 23 is previously programmed to reach a point P4 which is spaced in the X direction from the point P2 by the inner diameter D of the bore to be finished. Then, pulses are applied to the X axis pulse motor 14 so that the tip S2 of the probe 23 reaches the point P4 in accordance with the program. However, the tip S2 has its movement stopped by the inner wall of the bore so that it is forced into contact with a point P3 on the inner wall surface while the detector head 21 still continues moving to reach its programmed position. As a result, the probe 23 is displaced by $\Delta x_2$ to generate in the differential transformer 231 a voltage $e2$ which corresponds to the displacement of the probe 23. The output voltage $e2$ from the differential transformer 231 is applied to the analog calculator 17 which then performs a calculation of $(e1 + e2)$. The output from the analog calculator 17 is reduced to one-half by means of the multiplier 19 and then applied to the analog-digital converter 18. The output from the analog-digital converter 18 is applied to the tool position correcting circuit 12. In other words, the input to the tool position correcting circuit 12 is a correcting quantity which is equal to $(\Delta x1 + \Delta x2)/2$ or a correcting quantity necessary for finishing the bore which has been roughly finished.

In FIG. 6 the probes 22 and 23 are attached to the detector head 21 in such a manner that the straight line 62 connecting the tips S1 and S2 of the probes 22 and 23 crosses the spindle axis at right angles and extends in parallel with the X axis pole screw shaft. Therefore the error $(\Delta x1 + \Delta x2)$ to be detected is the error in the inner diameter of the work piece 10.

In the final finish machining, the numerical controller 11 serves to correct the command information for the final finish machining in accordance with the correcting quantity applied to the tool position correcting device and distribute pulses to the X axis pulse motor 14 and Z axis pulse motor 13. After completing measurement and before starting the final finish machining, the rotary section 25 is released from being clamped and rotated by the rotary actuator 26; whereas the detector head 21 returns to its retreated position B.

Figure 5:
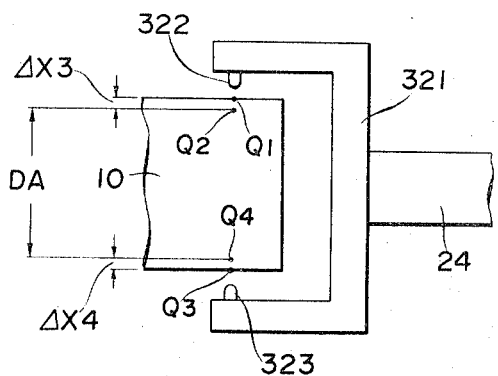
FIG. 5 is a similar view to FIG. 3, showing the principle of measurement.

FIG. 5 shows how the outer diameter of the work piece 10 is measured. A detector head 321 is fixed to the arm 24. A pair of probes 322 and 323 are attached to the detector head 321 in opposition to each other and are directly connected to the corresponding differential transformer. The procedures of measurement are as follows:

When pulses are applied to the X axis pulse motor 14 the tip of the probe 322 reaches a predetermined point Q2 which is still now inside the work piece roughly processed, in accordance with the program. However, the tip of the probe 323 has its movement interrupted by the outer surface of the roughly finished work piece to be brought into contact with a point Q1 on the outer surface while the detector head 321 continues moving to reach its programmed position, with the result that the probe 322 is displaced by $\Delta x_3$ which is equal to the spacing between Q1 and Q2. As a consequence, a voltage $e3$ which corresponds with the displacement of the probe 322 is generated in the differential transformer. The output voltage e3 from the differential transformer is then fed to the analog calculator 17.

Then, pulses are applied to the X axis pulse motor 14 so that the tip of the probe 323 reaches a point Q4 which is spaced from Q2 in the X direction by the distance of DA or the outer diameter of the finished work piece 10, in accordance with the program. However, the tip of the probe 323 has its movement stopped by the outer surface of the work piece so that it is forced into contact with a point Q3 on the outer surface while the detector head 321 continues moving to reach its programmed position. Therefore, the probe 323 is displaced by $\Delta x_4$ to generate in the differential transformer a voltage $e4$ which corresponds with the displacement of the probe 323.

The output voltage $e4$ is applied to the analog calculator 17. The output $(e3 + e4)$ from the analog calculator 17 is then reduced to one-half by means of the multiplier 19 and converted into digital quantity by the analog-digital converter 18 to be applied to the tool position correcting circuit 12. In other words, the input to the tool position correcting circuit 12 is a correcting value which is equal to $(\Delta x3 + \Delta x4)/2$.

The invention has been described by way of example which is provided with a rotary retreating mechanism. However, since the purpose of the retreating movement is only to avoid the measuring head interfering with the movement of tools, linear type or rotary/linear composite type of retreating mechanism may conveniently be used.

According to this invention the probes 22 and 23 are brought into direct contact with the object to be measured for detecting the error. However, a non-contact type of means such as a pneumatic electric micrometer may also be used. Although the differential transformers 221 and 231 are of a type which develops analog electric quantities, transducers which develop digital quantities may also be used. In this case if a digital calculator is used in place of the analog calculator 17, the analog-digital converter 18 may be omitted.

There are two types of numerical controllers: one is a type which controls in the X direction in accordance with the specified radius of the work piece; another is a type which controls in the X direction in accordance with the specified diameter. The embodiment has been explained in connection with the numerical control which is carried out in accordance with the specified radius. However, the numerical controller of this invention can be modified so that it controls in accordance with the specified diameter. In such a modification the multiplier 19 is omitted.

According to this invention the detector head is so designed that it can be retreated to avoid the danger that it interferes with the tools, and that during measurement when the detector head is returned to the measuring position, even if the detector head is positioned inaccurately, a high precision measurement of the work piece can be achieved without being affected by the positioning error.

Figure 8:
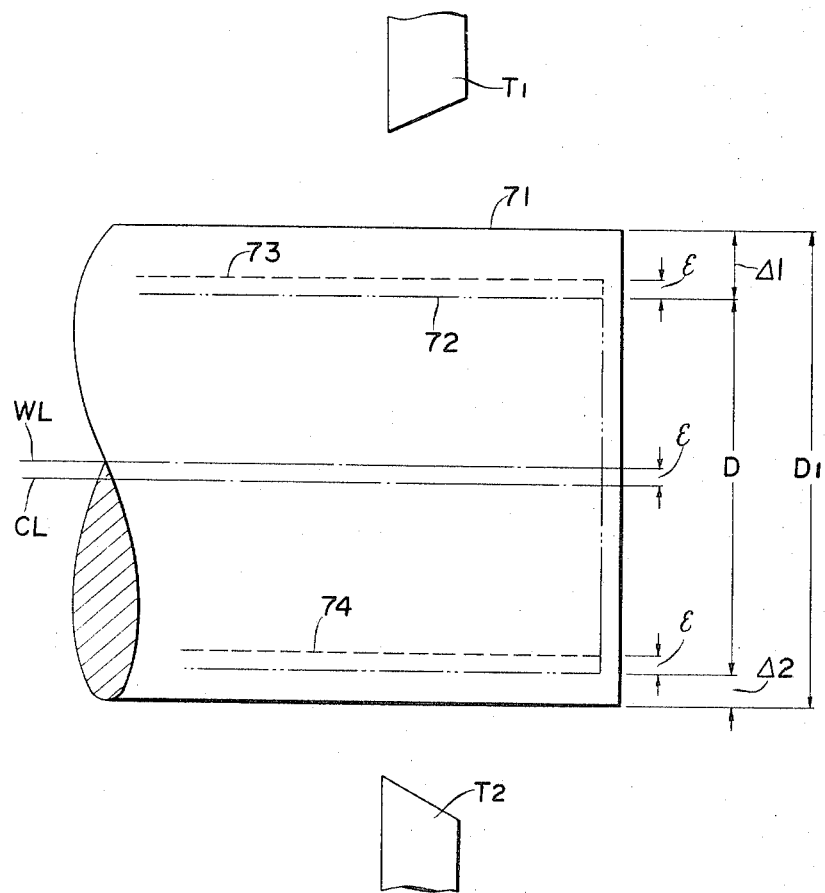
FIG. 8 is a view for explaining the principle of this invention.

FIG. 8 is to explain the principle of this invention. The work piece 71 rotates around the actual center axis WL of the spindle. It is supposed that there is a deviation $\epsilon$ between the programmed center axis CL of the spindle and the actual center axis WL of the spindle. This deviation $\epsilon$ results from the disagreement of the machine's co-ordinate system and the program's co-ordinate system due to the thermal deformation of the machine, manufacturing error of the machine, etc. The programmed machining line 72 is spaced from the programmed center axis CL of the spindle so that the diameter D can be obtained with the CL of its center. The actual diameter of the work piece to be machined is D1. Of the errors $\Delta 1$ and $\Delta 2$ in the radial direction of the work piece 71 from the programmed machining line 72, the larger one $\Delta 1$ may be expressed by the following equation:

$$\Delta 1 = D1/2 - D/2 + \epsilon \tag{E1}$$

The smaller error $\Delta 2$ may be expressed as, $$\Delta 2 = D1/2 - D/2 - \epsilon \tag{E2}$$

When the work piece 71 is machined by the tool T1, it is necessary that the position of T1 is corrected so the tip thereof traces along the line 73. The position-correcting quantity $\Delta T1$ for T1 may be expressed by the following equation:

$$\Delta T1 = \Delta 1 - \epsilon = (D1 - D)/2 \tag{E3}$$

When the work piece 71 is to be machined by the tool T2, it is necessary that the position of T2 is corrected so the tip thereof traces along the line 74. The position-correcting quantity $\Delta T2$ for T2 is expressed as follows:

$$\Delta T2 = \Delta 2 + \epsilon = (D1 - D)/2 \tag{E4}$$

As will be clear from the equations E3 and E4, if the control is to be carried out in accordance with the specified radius the correcting quantities for the tool position are a half of the difference between the actual diameter D1 and the programmed diameter D (if the control is to be carried out in accordance with the specified diameter, the correcting quantities are the difference between D1 and D). According to this invention the probes 22 (322) and 23 (323) are alternately brought into contact with the work piece at two positions diametrically spaced from each other by the programmed distance D (DA) to detect machining errors, of which the average value is then used as a correcting quantity for the tool position. Therefore the numerical controller of this invention works properly irrespective of the displacement of the spindle due to the thermal deformation of the machine tool and disagreement of the machine's co-ordinate system and program's co-ordinate system, and is not affected at all by the error in positioning the detector head.

The detector head is securely attached to the cross slide and travels in accordance with numerical control. This permits to measure the objects having widely varying diameters.

We claim:

1. A method of automatically measuring an object, particularly adapted for use with a numerically-controlled lathe provided with a spindle for holding the object, comprising the automatic, programmed steps of actuating a detector head including probes to travel so that the probes are alternatively brought into contact with the object to be measured which has been roughly processed at two diametrically spaced positions on the object, detecting deviations of the actual dimension of the object from the programmed dimension thereof in the form of electric quantities developed by displacements of the probe, and calculating the average value of the deviations for determining a tool position correcting quantity.

2. A method in accordance with claim 1 wherein said detector head includes a pair of oppositely arranged probes, and said head actuating step comprises locating said detector head at a measuring position in a manner such that a straight line connecting the probes at tips thereof crosses the axis of the spindle at right angles, actuating the detector head to travel toward a first predetermined point still found inside the object to an extent such that the tip of one of the probes may move as far as the first predetermined point but wherein its movement is interrupted by a first corresponding peripheral portion of the object by contacting a point on the first peripheral portion while the detector head programmatically continues travelling, thus obtaining a displacement of the probe relative to the detector head; then actuating the detector head to travel toward a second predetermined point still found inside the object oppositely of the first predetermined point to such an extent that the tip of the other probe may move as far as the second predetermined point but wherein the other probe has its movement interrupted by a second corresponding peripheral portion of the object by coming into contact with a point on the second peripheral portion while the detector head programmatically continues travelling, thus obtaining a displacement of the other probe relative to the detector head, and transducing the displacements into corresponding electric quantities.

3. An automatic measuring device for measuring an object which is adapted for use with a numerically-controlled lathe provided with a spindle for holding the object and having a program controlled tool for machining said object, comprising: numerical control means; cross sliding means adapted to move in a direction perpendicular to the axis of the spindle; driving means for moving said cross sliding means in response to commands from said numerical control means; a detector head provided on said cross sliding means, and including a pair of oppositely arranged probes, means for moving said detector head to a measuring position such that a straight line connecting said probes at the tips thereof crosses the axis of said spindle at right angles, said detector head functioning for detecting deviations of the actual dimension of the object from a programmed dimension; said detector head having means for transducing deviations thus detected into corresponding electric quantities; means electrically connected to said transducing means for producing an electrical output signal representative of the average value of said deviations; and means for inputting said output signal into the numerical control means of said lathe for correcting the tool position program thereof.

* * * * *